United States Patent
Hartog (12)

(10) Patent No.: US 8,134,696 B2
(45) Date of Patent: Mar. 13, 2012

(54) MEASURING BRILLOUIN BACKSCATTER FROM AN OPTICAL FIBRE USING A TRACKING SIGNAL

(75) Inventor: Arthur H. Hartog, Martyr Worthy (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 237 days.

(21) Appl. No.: 12/444,186

(22) PCT Filed: Sep. 20, 2007

(86) PCT No.: PCT/GB2007/003585
§ 371 (c)(1),
(2), (4) Date: Apr. 3, 2009

(87) PCT Pub. No.: WO2008/040939
PCT Pub. Date: Apr. 10, 2008

(65) Prior Publication Data
US 2010/0002226 A1    Jan. 7, 2010

(30) Foreign Application Priority Data
Oct. 6, 2006   (GB) .................................. 0619779.2

(51) Int. Cl.
*G01N 21/00* (2006.01)
(52) U.S. Cl. ...................................................... 356/73.1
(58) Field of Classification Search .................. None
See application file for complete search history.

(56) References Cited

U.S. PATENT DOCUMENTS

| | | | |
|---|---|---|---|
| 6,055,044 A * | 4/2000 | Uchiyama et al. | 356/73.1 |
| 6,700,655 B2 * | 3/2004 | Uchiyama et al. | 356/73.1 |
| 2001/0050768 A1 | 12/2001 | Uchiyama et al. | |
| 2006/0018586 A1 | 1/2006 | Kishida | |

FOREIGN PATENT DOCUMENTS

| | | |
|---|---|---|
| EP | 0907073 A1 | 4/1999 |
| EP | 1052494 A2 | 11/2008 |
| EP | 1045237 B1 | 2/2009 |
| JP | 05-240699 | 9/1993 |
| WO | 2005106396 A2 | 11/2005 |
| WO | 2008040939 A2 | 4/2008 |

OTHER PUBLICATIONS

Thevenaz et al. "Novel Schemes for Optical Signal Generation Using Laser Injection Locking with Application to Brillouin Sensing", Measurement Science and Technology, vol. 15, No. 8, pp. 1519-1524, Jul. 2004.

* cited by examiner

*Primary Examiner* — Tu Nguyen
(74) *Attorney, Agent, or Firm* — Brandon S. Clark; Rodney Warfford (57) ABSTRACT

A method for measuring Brillouin backscattering from an optical fiber, includes frequency mixing a first signal with a frequency representative of the Brillouin frequency shift in backscattered light received from a deployed optical fiber with a second signal at a frequency that varies in time in the same manner as a Brillouin shift previously measured from the fiber to produce a difference signal with a difference frequency that has a nominally constant value corresponding to the situation where the received light has a Brillouin shift that matches the previously measured shift. The difference signal is acquired and processed to determine properties of the Brillouin shift and corresponding physical parameters producing the shift. The frequency mixing can be carried out optically or electrically. Techniques for acquisition of the difference signal include the use of parallel frequency measurement channels and fast rate digital sampling.

35 Claims, 3 Drawing Sheets

MEASURING BRILLOUIN BACKSCATTER FROM AN OPTICAL FIBRE USING A TRACKING SIGNAL

BACKGROUND OF THE INVENTION

1. Field of the Invention

The present invention relates to a method and apparatus for measuring Brillouin backscattered light from an optical fibre used for optical time domain reflectometry.

2. Description of Related Art

Optical time domain reflectometry (OTDR) is a technique that uses optical fibre to make remote measurements of various parameters. A probe pulse of light is launched into an end of a fibre that is deployed through a region of interest, for example down an oil well. The pulse propagates along the fibre, and part of the light is backscattered from points along the length of the fibre and returns to the launch end, where it is detected. The propagation time to the scattering point and back is recorded as the light returns, so the location of the scattering point can be calculated using the speed of propagation in the fibre. Also, various physical parameters such as temperature, strain and pressure have an effect on how the light is scattered, including producing Raman and Brillouin frequency shifts. The value of the parameters can be calculated from the size, width and intensity of these frequency shifts. Thus, by making the appropriate conversion from time to distance, a map of the distribution of a physical parameter along the fibre length can be obtained.

In Brillouin-based OTDR, one or more Brillouin lines are measured in the scattered light spectrum. These lines are shifted in frequency from the frequency of the probe pulse. From a measured Brillouin spectrum, one can extract at least the intensity and width of the line or lines and the size of the frequency shift, and use this information to determine physical parameters along the fibre.

Conventionally, Brillouin signals have been measured by direct detection, where the Brillouin light is incident directly on a photodetector, or by heterodyne detection, in which the Brillouin signal is mixed with a signal from a local oscillator and the resulting difference frequency signal is passed for detection.

One measurement technique uses optical discrimination, in which an optical filter switches light between the two arms of a Mach-Zehnder interferometer, and an estimate of the central frequency of the Brillouin line is obtained from the relative intensities of the optical signals emerging from each arm [1]. A similar procedure relies instead on electrical discrimination [2].

A problem with discriminator-based techniques is the need to employ a wide input frequency spectrum to capture the full range of potential output signal frequencies. The necessary broad bandwidth tends to degrade performance.

Other techniques are based on frequency scanning and recording an intensity/time signal for each scan. For example, one may scan an optical filter across the expected frequency spectrum before passing the filtered light to a detector. The optical filter may be a Fabry-Perot interferometer that is scanned slowly compared with the pulse repetition frequency of the probe pulses. For each pulse a series of intensity measurements is made as a function of time/distance along the fibre, and may be further averaged over several pulses at each frequency. A series is recorded for every position of the filter, from which a Brillouin spectrum for each location along the fibre can be constructed [3].

An alternative approach [4, 5] uses a microwave heterodyne method, in which the backscattered light is mixed on a photodiode, thus creating a beat frequency spectrum that shifts the information from the optical domain to the microwave domain. An electrical local oscillator is scanned in frequency and a microwave receiver section passes a fixed intermediate frequency that is further amplified, filtered and detected, thus creating a quasi-DC signal. The latter provides an indication of the power within the bandwidth of the system as a function of position along the fibre.

For these various scanning methods, the data acquisition time is typically slow, since the signals must be averaged in two dimensions. Depending on the sampling interval in the frequency offset domain and the span of frequencies to be covered, this can be a lengthy process during which essential but sparsely used information is acquired. A large frequency range must be looked at for each position along the fibre to ensure that the shifted frequency is found, but the frequency line itself occupies only a small part of that range. Measurements outside the line must be made to locate the line, but contain no information regarding the parameter being measured.

BRIEF SUMMARY OF THE INVENTION

Accordingly, a first aspect of the present invention is directed to a method for measuring Brillouin backscattering from an optical fibre, comprising: launching a probe pulse of coherent light with a frequency $f_0$ into an optical fibre; receiving backscattered light from the optical fibre that includes at least one Brillouin spectral line at a frequency $f_B(t)$ shifted from $f_0$ by a Brillouin shift, the Brillouin spectral line varying with time/distance along the fibre; producing a first signal that is representative of $f_B(t)$; generating a second signal at a frequency $f_1(t)$ that varies with time in the same manner as a Brillouin shift $f_B(t)-f_0$ previously measured from the optical fibre, using information defining the previously measured Brillouin shift; mixing the first signal and the second signal to produce a difference signal at a difference frequency $\Delta F(t)=f_B(t)-f_1(t)$, where $\Delta F(t)$ has a nominally constant value with respect to time corresponding to the received backscattered light having a Brillouin shift that matches the previously measured Brillouin shift; acquiring the difference signal; and processing the difference signal to determine one or more properties of the Brillouin spectral line of the received backscattered light.

Performing frequency mixing of the Brillouin backscatter with a frequency that tracks a previous measurement of the Brillouin backscatter effectively confines the measurement to a known frequency window expected to contain or at least overlap the present Brillouin frequency in most circumstances. Thus, the frequency range which it is necessary to observe to locate the Brillouin frequency is very much reduced compared to the full range of possible Brillouin frequencies that is scanned according to conventional Brillouin measurement techniques. Measurement times and the amount of data processing required are thereby greatly reduced.

The method may further comprise using information relating to the Brillouin spectral line determined from processing the difference signal to update the information defining the previously measured Brillouin shift, thereby updating the frequency $f_1(t)$ of the second signal. For example, the method may comprise determining the difference $\delta$ between the actual value of the difference frequency $\Delta F(t)$ obtained by mixing the first signal and second signal and the nominal value of $\Delta F(t)$ for one or more values of t; and using the values of $\delta$ thus determined to update the information defining the previously measured Brillouin shift, thereby updating the frequency $f_1(t)$ of the second signal. In this way, any changes in the Brillouin shift caused by a change in the fibre environment from one measurement to the next can be accommodated so that the frequency tracking of the received backscatter is maintained over the long term, thus retaining the received light within the observed frequency window.

In some embodiments, producing the first signal that is representative of $f_B(t)$ comprises: producing coherent light at a frequency $f_L$ and directing it onto an optical detector; directing the received backscattered light onto the optical detector to mix with the coherent light at $f_L$ and generate an intermediate signal at a difference frequency $\Delta f_i(t) = f_B(t) - f_L$; and using the electrical output of the optical detector at frequency $\Delta f_i(t)$ as the first signal; generating the second signal comprises applying the information defining the previously measured Brillouin shift to an electrical oscillator to generate an electrical signal at the frequency $f_1(t)$; and mixing the first signal and the second signal to produce a difference signal comprises mixing the electrical output of the optical detector with the electrical signal from the electrical oscillator to produce an electrical signal at the difference frequency $\Delta F(t)$. Such an embodiment therefore utilises frequency mixing of electrical signals, whereby the received backscatter is converted into an electrical signal in the microwave frequency domain by the intermediate frequency mixing stage, before being mixed with an electrical signal that tracks the previously measured Brillouin shift. The difference frequency $\Delta f_i(t)$ may be less than 100 GHz.

Further, the frequency $f_0$ may be equal to the frequency $f_L$. Conveniently in this regard, one may use a single optical source to produce both the coherent light at the frequency $f_L$ and the probe pulse at frequency $f_0$ for launching into the optical fibre.

Alternatively, different sources may be used to generate the two optical outputs. For example, the coherent light at the frequency $f_L$ may be produced by: modulating an output of an optical source used to produce the probe pulse for launching into the optical fibre so as to generate modulation sidebands; injection-locking a second optical source to one of the modulation sidebands; and using the output of the second optical source as the coherent light at the frequency $f_L$.

In other embodiments, producing the first signal that is representative of $f_B(t)$ comprises taking the received backscattered light; generating the second signal comprises applying the information defining the previously measured Brillouin shift to a tunable optical source to generate a coherent optical signal at the frequency $f_1(t)$; and mixing the first signal and the second signal to produce a difference signal comprises directing the received backscattered light onto an optical detector and directing the coherent optical signal onto the same optical detector to produce an electrical signal at the difference frequency $\Delta F(t)$. This approach utilises frequency mixing in the optical domain, whereby the received backscatter is directly mixed with an optical signal that tracks the previously measured Brillouin shift. Detection of the light results in an electrical signal at the difference frequency of interest, suitable for acquisition and processing according to various embodiments of the invention.

The method may further comprise, before processing the difference signal, mixing the electrical signal from the optical detector at the difference frequency $\Delta F(t)$ with the output from an electrical local oscillator at a constant frequency $f_C$ to reduce the difference frequency $\Delta F(t)$ to a lower frequency $\Delta F_2(t)$. This may be useful to achieve a difference signal with a frequency suitable for acquisition by fast analog to digital sampling.

For difference frequency mixing in the optical domain, the output of one of the tunable optical source used to generate the coherent optical signal at the frequency $f_1(t)$ and an optical source for generating the probe pulse for launching into the fibre may be modulated to produce modulation sidebands; with the other of the tunable optical source and the optical source being injection-locked to one of the modulation sidebands; and the frequency of the modulation being controlled using the information defining the previously measured Brillouin shift to generate the coherent optical signal at the frequency $f_1(t)$.

Once the difference frequency signal is obtained, various approaches can be taken to recording and processing the data. In some embodiments, acquiring the difference signal comprises digitising the difference signal to obtain a plurality of samples of the difference signal; and processing the difference signal comprises digital signal processing of the samples. A fast analog to digital converter may be used to generate a suitable number of samples for this simple technique to give results with a useful level of accuracy. For example, the difference signal may be digitised using a sampling rate that is at least twice the largest anticipated value of $\Delta F(t)$.

In other embodiments, acquiring the difference signal comprises: separating the difference signal into a plurality of channels, each channel covering a separate frequency band; individually detecting the portion of the difference signal in each channel; and digitising each detected portion of the difference signal to obtain a plurality of samples for each channel; and processing the difference signal comprises digital signal processing of the samples from each channel with respect to time to determine one or more properties of the Brillouin spectral line.

In yet another embodiment, the difference signal may be passed through a circuit having an output voltage dependent on the instantaneous value of the difference frequency $\Delta F(t)$. In contrast to the prior art method, in the present invention, the range of the discriminator can be restricted from the entire range of possible values of the Brillouin frequency shift to only those anticipated for the difference frequency. This results in a considerable reduction in effective bandwidth and thus in system noise.

The one or more properties of the Brillouin spectral line determined from the difference signal may include at least one of: the Brillouin frequency $f_B(t)$; the intensity of the Brillouin spectral line; and the linewidth of the Brillouin spectral line.

The method may further comprise calculating the value of one or more physical parameters to which the optical fibre is subject from the one or more determined properties of the Brillouin spectral line and converting time into distance along the optical fibre to obtain an indication of the distribution of the one or more physical parameters over the length of the optical fibre.

Also, the method may further comprise repeating the method for further successive probe pulses, and averaging over a plurality of probe pulses to obtain a more accurate determination of the one or more properties of the Brillouin spectral line and/or the one or more physical parameters.

In some embodiments, the method may further comprise, prior to the launching of a probe pulse into the optical fibre, measuring the Brillouin shift produced by the optical fibre to obtain information defining the Brillouin shift by: a) launching a probe pulse of coherent light with a frequency $f_0$ into the optical fibre; b) receiving backscattered light from the optical fibre that includes at least one Brillouin spectral line at frequency $f_B(t)$ shifted from $f_0$ by a Brillouin shift; c) producing an initial signal that is representative of $f_B(t)$; d) generating a further signal at a constant frequency $f_C$ for at least the time taken for backscattered light to be received from the remotest part of the optical fibre; e) mixing the initial signal and the further signal to produce a difference signal at a difference frequency $\Delta F_i(t)=f_B(t)-f_C$; f) acquiring the difference signal $\Delta F_i(t)$; g) repeating steps a) to f) for a plurality of values of $f_C$ across the range of possible values of $f_C$ that give a difference signal within the bandwidth of apparatus used to acquire the difference signal; h) processing the acquired difference signals to determine the distribution of the Brillouin shift with time/distance along the optical fibre; and i) storing information defining the determined Brillouin shift for use in generating the second signal at frequency $f_1(t)$. These additional preceding steps can be considered to comprise a learning or calibration stage, in which a full map of the Brillouin frequency distribution over the fibre is obtained by making a detailed measurement comprising full scans over the whole relevant frequency range for each point along the fibre, to give the necessary information defining the Brillouin shift that allows subsequent measurements using frequency tracking to be considerably faster than conventional full frequency scan or discriminator-based measurements.

A second aspect of the present invention is directed to apparatus for measuring Brillouin backscattering from an optical fibre comprising: an optical source operable to generate probe pulses of coherent light at a frequency $f_0$ and launch the probe pulses into an optical fibre; a backscatter receiving component arranged to receive backscattered light from the optical fibre that includes at least one Brillouin spectral line at a frequency $f_B(t)$ shifted from $f_0$ by a Brillouin shift and produce therefrom a first signal that is representative of $f_B(t)$; a programmable local oscillator; a memory array for storing information defining a Brillouin shift $f_B(t)-f_0$ previously measured from the optical fibre, the memory array connected to the programmable local oscillator such that the stored information can cause the programmable local oscillator to generate a second signal having a frequency $f_1(t)$ that varies with time in the same way as the previously measured Brillouin shift; a frequency mixer for receiving and mixing the first signal and the second signal to produce a difference signal at a difference frequency $\Delta F(t)=f_B(t)-f_1(t)$, where $\Delta F(t)$ has a nominally constant value with respect to time corresponding to the received backscattered light having a Brillouin shift that matches the previously measured Brillouin shift; an acquisition system operable to receive the difference signal from the frequency mixer and record the difference signal; and a processor operable to process the recorded difference signal to determine one or more properties of the Brillouin spectral line of the received backscattered light and to update the memory array accordingly.

BRIEF DESCRIPTION OF THE DRAWINGS

For a better understanding of the invention and to show how the same may be carried into effect, reference is now made by way of example to the accompanying drawings in which.

DETAILED DESCRIPTION OF THE INVENTION

The present invention proposes making measurements of a Brillouin shift frequency spectrum from an optical fibre by heterodyning (frequency mixing) the received backscattered Brillouin light with a frequency-varying signal that tracks in time the expected variation of the Brillouin shift along the length of the fibre (equivalent to the expected variation with time). Thus, for all points along the fibre, only a small window of frequencies is considered, defined by the tracking signal, and the window shifts to track the Brillouin line. At each point, therefore, only the relevant part of the whole possible Brillouin frequency range is measured, thus eliminating the large amount of redundant measurements made by methods that scan the whole frequency range for every point along the fibre to locate the Brillouin line at that point. In comparison with an alternative of using a frequency discriminator for direct measurement of the Brillouin frequency, the present invention reduces the required bandwidth and thus improves the signal-to-noise ratio.

This is achieved by using a previously obtained measurement (calibration or learning measurement) of the Brillouin spectrum for the fibre of interest to generate a tracking signal having a time-varying frequency that follows the Brillouin shift along the fibre length. Information relating to the previous measurement is applied to a local oscillator to produce the tracking signal, which is then heterodyned with the received backscattered light. The heterodyning can be carried out optically or electrically, as explained further below with regard to various embodiments.

In the event that there has been little or no change affecting the fibre and the Brillouin shift it produces between the learning measurement and present measurement, the tracking signal will follow the frequency of the Brillouin line from the fibre exactly or very closely. The difference frequency produced by the heterodyning will therefore be approximately constant for the whole length of the fibre. Any variations in the Brillouin shift, caused by a change in the temperature or strain of the fibre for example, will cause the received Brillouin line to move from its position in the learning measurement, and the tracking signal will no longer match the received light. The difference frequency will then vary from the nominally constant value for those parts of the fibre where there has been a change in the conditions that produce the Brillouin shift. Hence, measurement of the frequency of the heterodyned signal will indicate any parts of the fibre where there has been a change from the learning measurement. The size of the variation from the nominally constant difference frequency corresponds to the size of the change in conditions, so a measurement of the local conditions along the fibre length can be derived from a measurement of the difference frequency over the fibre length.

Note that the tracking signal can be chosen to match the frequency of the learning measurement, so that the nominally constant value for the difference frequency is zero. Alternatively, the tracking signal can be shifted from the learning measurement (by including in it a DC frequency component, for example) to give a nominally constant value greater than zero; this arrangement tends to simplify any signal processing employed in acquiring and processing the difference frequency.

First Example Embodiment

Figure 1:
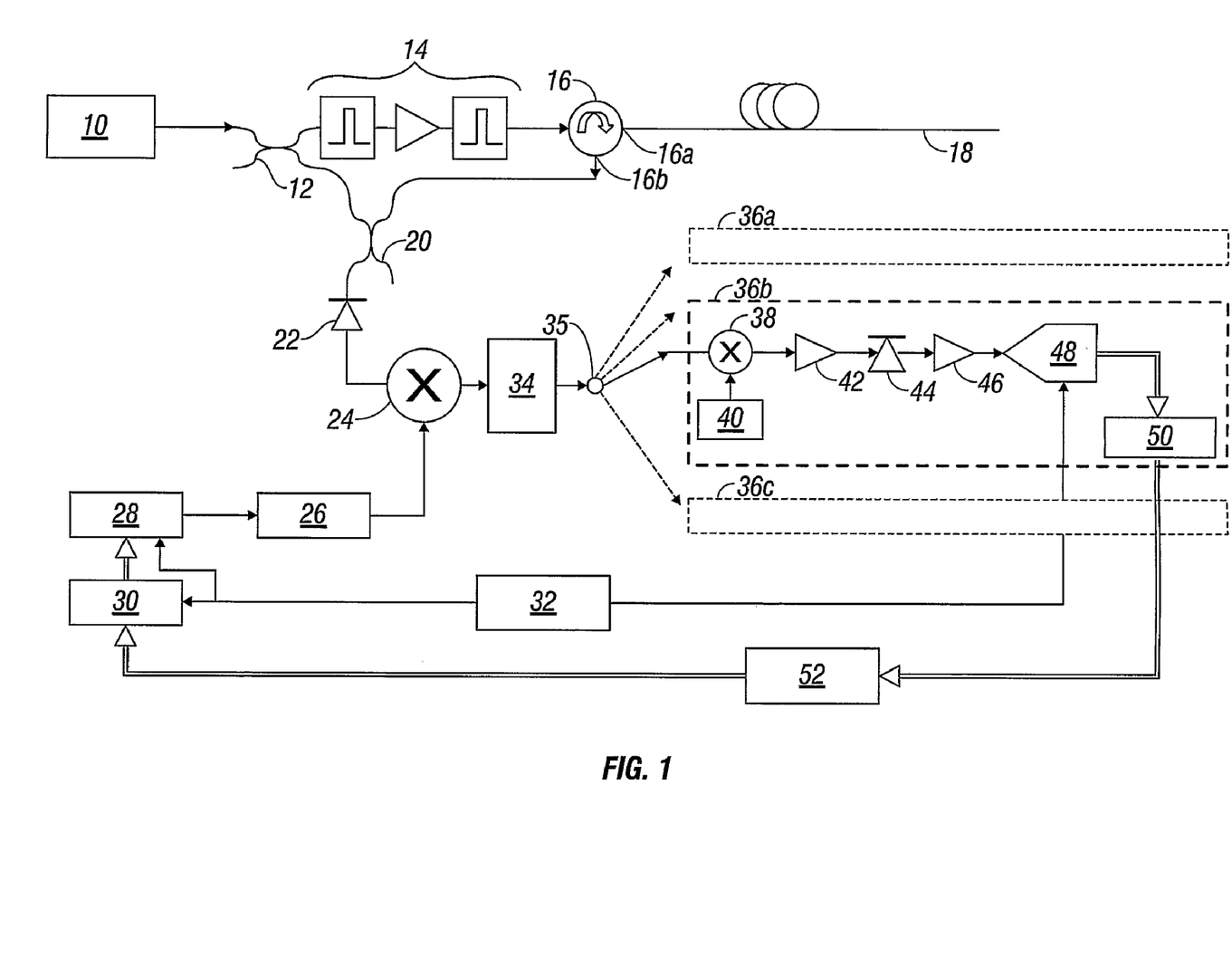
FIG. 1 shows a schematic representation of apparatus for carrying out a Brillouin backscatter measurement in accordance with a first embodiment of the present invention.

FIG. 1 shows a schematic representation of apparatus for implementing a measurement method according to an embodiment of the present invention.

An optical source 10 operable to generate narrow-band coherent light (such as a laser) produces an output beam at a frequency $f_0$. The beam is directed into a beam splitter 12 (such as a 3 dB fibre splitter) that divides the output beam into a first part for launching into a deployed optical fibre, and a second part to be mixed with light received back from the fibre. The first part passes through a pulse forming unit 14 that produces optical probe pulses of a desired repetition frequency, pulse duration and power, suitable for probing of the deployed fibre to obtain Brillouin backscatter. In this example the pulse forming unit 14 comprises two pulse generators/gates with an amplifier between; any required combination of optical components can be used to create the necessary output, though. The pulses at $f_0$ are then sent to an optical circulator 16 having a first port 16a to which is connected the deployed optical fibre 18. The pulses can thereby be launched into the fibre 18. Although an optical circulator is the preferred device, other means of effecting the desired function, such as power splitters or active devices (e.g. acousto-optic deflectors) may also be used.

A second port 16b of the circulator 16 is connected to a beam combiner 20 (such as a 3 dB fibre splitter), which is also connected to receive the second part of the beam from the optical source 10 from the beam splitter 12. An output of the beam combiner 20 is arranged to direct light onto an optical detector 22, such as a fast photodiode.

In use, therefore, the optical source 10 generates an output beam that is divided into two parts. A first part passes through the pulse forming unit 14 to form probe pulses, which are launched into the optical fibre 18 via the first port 16a of the optical circulator 16. Each pulse propagates along the length of the optical fibre 18, with Brillouin backscatter being produced during propagation, from each part of the fibre 18. The backscatter returns to the launch end of the fibre, where it is received by the circulator 16 at the first port 16a, and directed out of the second port 16b and into the beam combiner 20. Optionally, the received backscatter may be amplified before it reaches the combiner 20. In the combiner 20, the received Brillouin backscatter mixes with the second part of the output beam from the optical source 10, which is at frequency $f_0$. The Brillouin backscatter includes at least one Brillouin spectral line at a Brillouin frequency $f_B(t)$, where the time variation arises from the time-distance correspondence for light returned from the optical fibre 18 and the variation in the Brillouin shift with location along the fibre (different parts of the fibre being at different temperatures, strains, etc.). The mixed light is directed onto the optical detector 22, which has an electrical output representative of light incident upon it. The mixing therefore produces an electrical signal being an intermediate signal at a difference frequency $\Delta f_i(t) = f_B(t) - f_0$. This is referred to as a first signal, which contains information about the Brillouin frequency and Brillouin shift produced by the fibre and is hence representative of $f_B(t)$. As an example, in the case of an optical source 10 that generates an output beam at frequency $f_0$ corresponding to a wavelength of 1550 nm, the difference frequency will be around 11 GHz.

Although in this example the received Brillouin light is mixed with light from the optical source 10 at $f_0$ to produce the first signal, a separate optical source could be used, either also generating light at $f_0$, or at a different optical frequency $f_L$. If a separate optical source is used, the first optical source producing light for the probe pulses may have its output modulated to generate modulation sidebands, and a second optical source for generating the light at $f_0$ or $f_L$ to be mixed with the received Brillouin light can be injection locked to one of the modulation side bands. In each case, the effect is the same: the mixing of the two optical signals produces an electrical first signal having a lower frequency than the optical signals. Preferably, $f_0$ and $f_L$ are chosen so that the frequency of the first signal is less than about 100 GHz, i.e., the first signal is in the microwave domain.

Returning to FIG. 1, the optical detector 22 has its output connected to a mixer 24. Also connected to the mixer 24 is an electrical local oscillator 26. The local oscillator 26 is programmed to generate a signal at a frequency $f_1(t)$ which varies in time in the same manner as a Brillouin shift $f_B(t) - f_0$ previously produced by and measured from the optical fibre 18. This signal, referred to as a second signal, therefore tracks the Brillouin shift along the length of the fibre 18. In this example, the local oscillator 26 is a voltage controlled oscillator connected via a digital-to-analog converter 28 to a memory array 30 in which is stored information describing the previously measured Brillouin shift. A clock 32 is connected to the memory array 30 and the digital-to-analog converter 28 so that stored information is read out of the memory array 30 and passed to the local oscillator 26 in a manner that causes the second signal to be synchronised to the first signal for the Brillouin shift to be properly tracked. An example of a suitable local oscillator is a fast-tunable voltage controlled oscillator, such as the Hittite HMC588LC4B which has a tuning range of 8.0 GHz to 12.5 GHz and a tuning bandwidth of 65 MHz, which is fast enough to track changes in the Brillouin frequency with a spatial resolution along the fibre of better than 0.6 m. However, other oscillators and methods of applying information about the previously measured shift to the oscillator to create the tracking of the second signal could be used instead.

The mixer 24, on receipt of the first signal from the optical detector 22 and the second signal from the local oscillator 26, produces a difference signal having a time-varying difference frequency $\Delta F(t) = f_B(t) - f_1(t)$. Because the second signal at $f_1(t)$ is set to track the Brillouin frequency along the fibre length, according to an earlier measurement, the difference frequency $\Delta F(t)$ has a nominally constant value corresponding to the situation in which the presently measured Brillouin shift matches the earlier shift, where no perturbations to the physical parameters acting on the optical fibre 18 and causing the Brillouin shift have occurred between the times of the two measurements. Changes from the nominally constant value occur when there has been a change in the Brillouin shift at the corresponding point along the fibre.

Once the difference signal is generated in the mixer 24, it is acquired and processed to determine properties about the Brillouin shift along the fibre, such as intensity, frequency, and line width of the Brillouin line. From these properties, values of physical parameters such as temperature, strain, and pressure can be calculated using pre-established calibration relationships between the Brillouin properties and the parameters, to give a distributed measurement of one or more parameters along the extent of the fibre.

In the embodiment of FIG. 1, the acquisition of the difference signal for subsequent processing is achieved using a number of parallel frequency channels. The difference signal is passed to a bandpass filter 34 to remove any frequency components outside the bandwidth of the acquisition system, before being split into a plurality of parallel channels 36, each covering a separate but adjacent frequency band. Thus the electrical energy in the difference signal is divided by frequency, which allows a real-time frequency determination to be performed. In FIG. 1, N channels are depicted (channel 1 36*a* through channel i 36*b* to channel N 36*c*). For example, eight channels might be used (N=8), but other numbers of channels may be preferred. For eight channels, the central frequency of each channel might be separated by about 10-15 MHz.

Thus, the apparatus of FIG. 1 further comprises a signal splitter 35 to distribute the output of the bandpass filter 34 between the N channels. Each channel i then comprises a secondary mixer 38 that receives both the incoming signal from the signal splitter 35, plus a signal from electrical secondary local oscillator 40. Each local oscillator 40 is set to a different frequency so that the mixing process in each channel selects the relevant frequency band for that channel. The resulting difference signal is then passed through an amplifier 42 before being detected by a microwave detector 44. The output of the detector 44 is further amplified in an amplifier 46, and the amplified signal is sampled and digitised using an analog-to-digital converter 48. The digitised samples generated by the converter 48 are stored in a memory unit 50, where each channel 36 has its own memory unit. The output of the converters 48 is a series of waveforms that define the amount of optical power at a variety of offset frequencies relative to that of the primary electrical local oscillator 26. The memory units 50 together comprise a memory array.

The memory array delivers the digitised samples to a processor 52, which is operable to perform signal processing necessary to determine from the samples the desired properties of the Brillouin backscatter (intensity, frequency, linewidth, etc.), and possibly further to determine from those properties the values of one or more physical parameters acting on the optical fibre 18 (temperature, pressure, strain, etc.).

The analog-to-digital converters 48 are also connected to the clock 32, that connects to the memory array 30 applied to the primary local oscillator 26. The second signal from the local oscillator 26 is thereby kept appropriately timed with respect to the data acquisition, to maintain the frequency tracking.

Typically, a first usage, or measurement cycle, of the apparatus of FIG. 1 (and other embodiments described below) will be to obtain a learning or calibration measurement, giving information defining the Brillouin shift to be used to generate the tracking signal. This requires the apparatus to be operated in a conventional fashion to acquire a detailed and full map of the Brillouin spectra along the fibre length. To do this, the frequency of the primary local oscillator 26 is kept constant during each individual probe pulse, but scanned from pulse to pulse over the entire relevant frequency range of the Brillouin backscatter. Appropriate acquisition and processing of the resulting signals is then performed to give a full three-dimensional plot of the Brillouin intensity as a function of both position along the fibre and of frequency offset (Brillouin shift from the original pulse frequency $f_0$). Further processing (such as fitting of the data for each point along the fibre to a Lorentzian spectral shape) then establishes the Brillouin peak frequency for all locations along the fibre. This information is then stored in the memory array 30 for subsequent operation of the apparatus.

In other words, during subsequent measurement cycles, the data stored in the memory array 30 is applied to the primary local oscillator 26 to generate the second signal at $f_1(t)$, so as to track the received Brillouin light along the fibre. Thus, after the probe pulse is launched down the optical fibre 18, the memory array 30 is read out to the local oscillator 26 sequentially at a rate selected to match the distance down the fibre from which the current backscatter is returning; this is controlled by the clock 32. For example, if the fibre is to be sampled at a spatial resolution of 2 m, one memory location from the memory array 30 needs to be read out at least every 20 ns. Preferably, the data is stored in the memory array in a format that can be used directly to program the digital-to-analog converter 28 to generate a time-dependent waveform to tune a voltage controlled oscillator used as the primary local oscillator 26. As a result, the voltage controlled oscillator 26 can arrange for the second signal at $f_1(t)$ to be in a predetermined position relative to the parallel measurement channels 36.

As mentioned, the Brillouin frequency and shift are expected to change over the long term (from one measurement cycle to the next), as physical changes occur in the environment of the fibre 18. Thus, the second signal, derived from the initial learning measurement, will begin to track the Brillouin frequency less accurately. To address this, the information in the memory array 30 is updated to maintain the tracking ability of the second signal.

This can be done by comparing the newly obtained frequency data from the current measurement cycle with the information stored in the memory array 30, and determining the difference $\delta$ for each point along the fibre. For those locations where $\delta$ is not zero, the existing value in the memory array can be replaced with the new value. The next measurement cycle will then have more accurate tracking than if no update was performed. The updating can be done for every measurement cycle, or more periodically if the variations between measurement cycles are slight, or only when a significant variation is detected. Also, the comparison to determine an update value $\delta$ may be carried out between other values (as may be necessary if the information stored in the memory array 30 differs from the example described above), such as between the current value of the difference frequency and its nominally constant value.

An aim of tracking the Brillouin shift according to the present invention is to produce a difference frequency that is nominally constant and approximately known, so that it is not necessary to consider a wide frequency range for every point along the fibre. Instead, it is only necessary to consider a small window of frequencies for each point along the fibre, within which the difference frequency is anticipated to lie. This greatly reduces the measurement time and complexity over conventional methods that scan across the entire potential frequency range for every location.

In this regard, therefore, it is possible to assume that any changes in the physical parameters under consideration will not exceed a certain level from that recorded in the learning measurement. This gives a corresponding maximum size to the frequency difference between the received Brillouin backscatter and the tracking signal, and hence a maximum size to the variation of the difference frequency from its nominally constant value. Thus, when configuring the apparatus for acquiring and processing the difference frequency, the frequency bandwidth to be monitored can be set with reference to the anticipated maximum size. To achieve this, the frequency bandwidth of the measurement system should preferably be selected to cover both sides of the anticipated peak to a sufficiently low level that firstly the peak itself can be determined from the measurement, and secondly that the frequency variation in the tracking can be accommodated.

However, there may be occasions where a part of the fibre is affected in such a way that there is a parameter change so great that the difference frequency is taken outside of the measurement bandwidth. In this case, it will not be possible to determine the properties of the Brillouin shift, and the underlying physical parameter, for that part of the fibre using the obtained measurement.

This can be readily addressed, however. The difference frequency has a Lorentzian lineshape, which decays slowly away from the central peak. Hence it is likely that at least part of the spectrum of the difference frequency will fall within the measurement bandwidth, even though the peak is missing. By considering the slope of the captured part of the spectrum across the measurement window, it is possible to determine whether the peak lies beyond the high frequency or low frequency side. This information about the difference frequency can be used to adjust the frequency of the tracking signal in the appropriate direction to better match the Brillouin shift at the particular fibre location, thus bringing the difference frequency at that point back within the measurement bandwidth for a subsequent measurement over the fibre length. It may be necessary to make more than one adjustment if the Brillouin line has been shifted very far from its position during the learning measurement. Furthermore, it may be that the difference frequency peak falls so far outside the measurement window that the direction of the required change in the tracking frequency cannot be determined. Rather than making a random choice, it may be preferred to simply scan the measurement across the whole range of possible frequencies to locate the difference frequency. This only need be performed for the particular point along the fibre, with acquisition elsewhere along the fibre unaffected. Therefore, the increase in measurement time is only slight, with an overall time still significantly less than conventional methods in which the whole frequency range is scanned for every point along the fibre.

Second Example Embodiment

Figure 2:
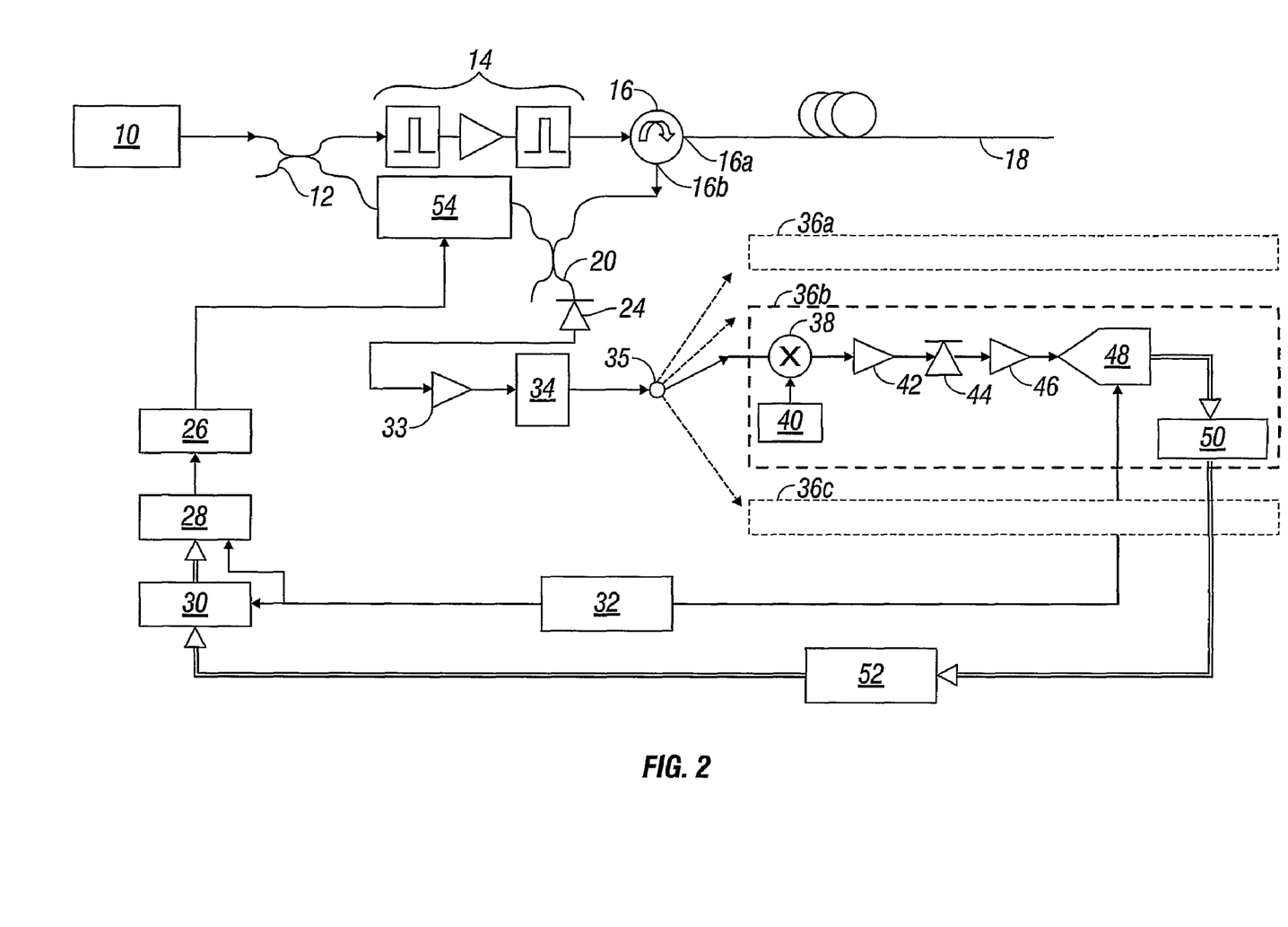
FIG. 2 shows a schematic representation of apparatus for carrying out a Brillouin backscatter measurement in accordance with a further embodiment of the present invention.

FIG. 2 shows a schematic representation of a second embodiment of apparatus according to the present invention. Like reference numerals are used for like components as compared to FIG. 1.

The second embodiment employs the same arrangement as FIG. 1 for generating and launching probe pulses in an optical fibre 18, using an optical source 10 whose output is gated and amplified to produce pulses, and launched into the fibre 18 via a circulator 16. Again, the returning Brillouin light is received at the fibre end and passed by the circulator to a beam combiner 20.

Also, the acquisition and processing components are the same as in FIG. 1. The difference frequency signal $\Delta F(t)$ is passed through a bandpass filter 34 before being divided between a plurality of parallel frequency channels 36 which produce digitised samples that are delivered from an array of memory units 50 to a processor 52.

Again as in FIG. 1, the processor 52 is further connected to a memory array 30 that stores information about the value of the Brillouin shift produced by the optical fibre 18 during a previous measurement cycle. This information is used to program a voltage controlled oscillator 26. Also, a clock 32 connects the frequency measurement channels with the memory array 30 and the digital-to-analog converter 28 to keep the tracking signal synchronised with the received Brillouin light.

The second embodiment differs from the first embodiment in the way in which the difference frequency $\Delta F(t)$ is obtained. To recall, in the first embodiment, the mixing of the first and second signals to produce the difference signal at $\Delta F(t)$ is carried out electrically. The second signal at frequency $f_1(t)$ is the direct output of an electrical local oscillator, while the first signal, representative of the Brillouin frequency $f_B(t)$, is obtained by difference frequency mixing of the Brillouin light at $f_B(t)$ with a further optical signal at frequency $f_L$ (where $f_L$ may equal $f_0$) in an optical detector to generate an electrical output with a frequency in the microwave range.

In contrast, in the second embodiment the mixing of the first and second signals is carried out optically. The first signal, representative of $f_B(t)$, is the direct output of the optical fibre 18, i.e. the received Brillouin light at $f_B(t)$. The second signal is also optical, obtained by applying the output of the electrical local oscillator 26, programmed by the memory array 30, to a tunable optical source to give a variable frequency optical output $f_1(t)$ with the required frequency variation to match the Brillouin shift from a previous measurement cycle. The first and second signals are then mixed together to produce the desired difference signal in an appropriate form for handling by the acquisition components of the apparatus.

In the example of FIG. 2, a beam splitter 12 is again located in the output beam of the optical source 10. The part of the output beam not destined for probe pulses is instead directed to a frequency shifter 54. The frequency shifter 54 has applied to it the output of the electrical local oscillator 26, so that the output of the frequency shifter 54, being the second signal, is an optical signal having the necessary variation in time of frequency as the previously recorded Brillouin shift stored in the memory array 30.

The first and second signals are then mixed together using a beam combiner 20 and mixer 24, where the mixer 24 comprises an optical detector arranged to receive the output of the beam combiner 20. The electrical output of the optical detector 24 is then amplified in an amplifier 33 (this is optional) before being passed to the bandpass filter 34 and subsequent distribution to the acquisition frequency channels 36 as described with respect to FIG. 1.

Any suitable method of producing a suitably varying optical signal at $f_1(t)$ can be employed. For example, the frequency shifter 54 may comprise an electro-optic modulator, operated as either a phase modulator or an amplitude modulator driven by a microwave frequency signal from the local oscillator 26. In either case, at least one sideband is generated in the modulator output, and by varying the applied microwave frequency, the frequency of the sideband can be adjusted, and used as the second signal. Alternatively, rather than derive the second signal directly from the output of the optical source 10 at $f_0$, a separate optical source may be used. The output of the main optical source 10 is modulated as just described, but a second optical source is injection-locked to the modulator output, and the output of this source is used as the second signal. This approach gives independent control of the intensity and frequency of the second signal [6]. However, for injection-locking embodiments, it is unimportant which of the two optical sources is the slave and which is the master. So, as a further alternative, the optical source 10 used to produce the probe pulses can be injection-locked to a separate modulated optical source used to produce the second signal.

Optical frequency shifting offers benefits in that the electrical frequency from the optical detector 24 is at a lower frequency than the Brillouin frequency shift, which reduces noise and allows a lower cost acquisition arrangement to be employed. A flatter frequency response is also possible. Additionally, because only a narrow portion of the electrical spectrum in the acquisition apparatus is used once the initial learning measurement is complete, the effect of variations in the transmission of the electrical (microwave) components on the Brillouin measurement is minimised, thus improving the accuracy of the measurement.

A further alternative that may be employed in an optical frequency mixing embodiment is to incorporate a further mixer between the optical detector 24 and the bandwidth filter 34, plus a further electrical local oscillator producing a signal at constant frequency. This signal is mixed in the mixer with the difference frequency signal $\Delta F(t)$ from the optical detector to produce a further difference frequency signal $\Delta F_2(t)$ at a nominally constant but lower frequency than $\Delta F(t)$. This reduction in frequency reduces noise and component cost.

Third Example Embodiment

An alternative to the frequency channel acquisition approach described with regard to the first and second example embodiments is an all-digital acquisition approach which employs an analog-to-digital converter to acquire the difference signal at a rate sufficient to carry out a frequency analysis. This approach may be applied to either the electrical mixing technique of the first example embodiment or the optical mixing approach of the second example embodiment.

Figure 3:
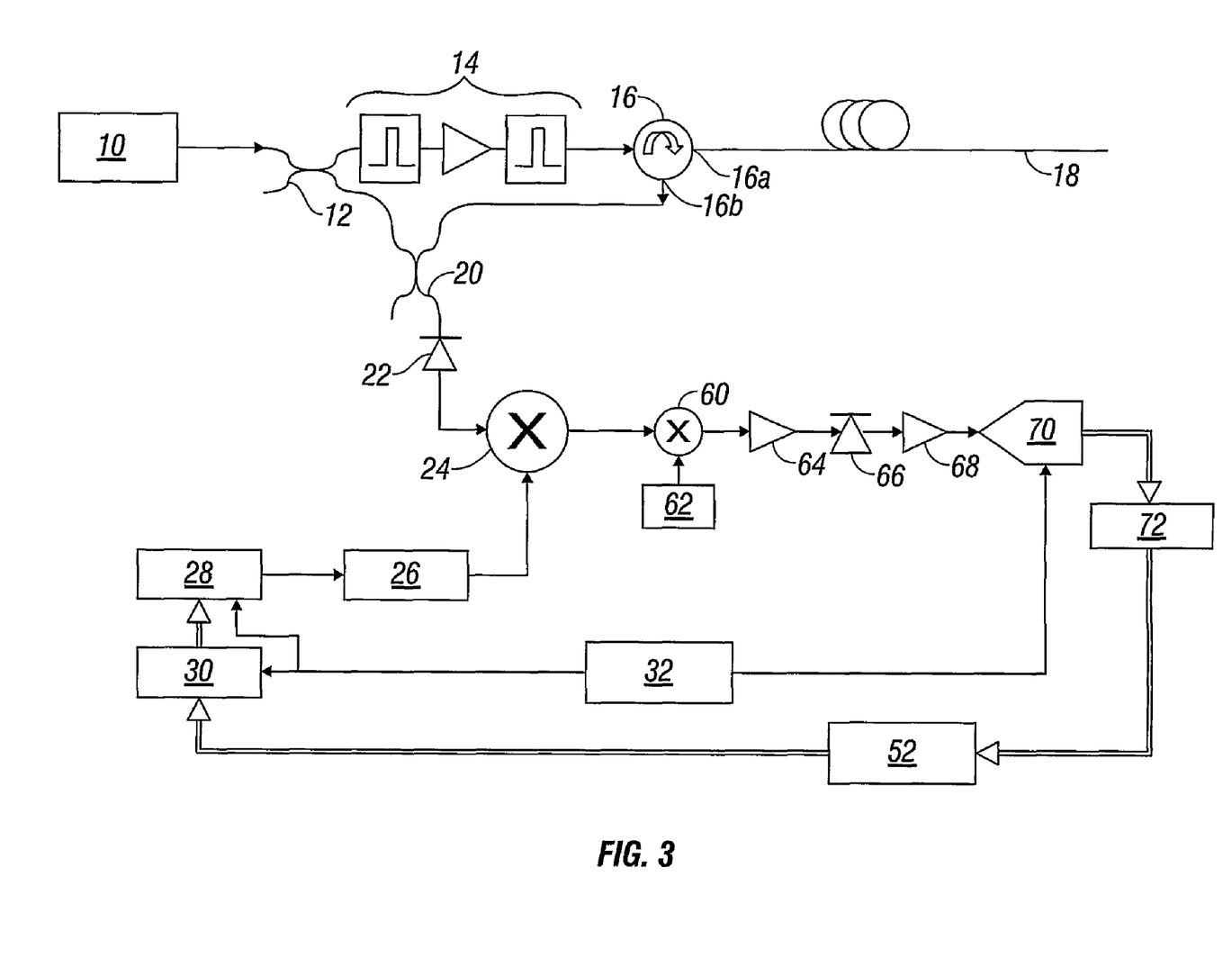
FIG. 3 shows a schematic representation of apparatus for carrying out a Brillouin backscatter measurement in accordance with a yet further embodiment of the present invention.

FIG. 3 shows a schematic representation of apparatus that uses all-digital acquisition, described only for the purposes of example in conjunction with the electrical frequency mixing approach of FIG. 1 (all-digital acquisition being equally applicable to other electrical mixing arrangements, and to optical mixing including that of FIG. 2). Hence FIG. 3 shows many features in common with FIG. 1, including the pulse generation and launch components, the intermediate difference frequency mixing in the optical detector 22, and the electrical difference frequency mixing in the mixer 24 that receives a second signal (tracking signal) from an electrical local oscillator 26 controlled by a clocked memory array 30 and digital-to-analog converter 28.

In this example, however, the nominally constant output of the mixer 24, at the difference frequency $\Delta F(t)$, is delivered to a secondary electrical mixer 60. The secondary electrical mixer 60 also receives a constant frequency signal from a secondary local oscillator 62 which is hence mixed with the difference signal $\Delta F(t)$. The resulting secondary difference frequency signal is amplified in an amplifier 64 before being passed through a bandpass filter 66 and a further amplifier 68. The mixing and filtering of the difference signal is intended to bring the frequency within a suitable range for analog-to-digital conversion (note that this secondary frequency mixing for frequency downconversion before detection of the signal can also be employed with channel detection arrangements if a reduced frequency is beneficial for the detection apparatus). The conversion is carried out by passing the modified difference signal to a fast analog-to-digital converter 70, where the converter is chosen appropriately to be suitable for sampling the modified difference signal. For example, a converter operating at 250 megasamples per second can accept a modified difference signal with a frequency in the range 0-100 MHz. A sampling rate which is at least twice the highest anticipated value of the frequency of the incoming signal is useful to achieve an accurate determination of the Brillouin properties. Hence the modification by the secondary mixer 60 can be used to reduce the frequency of the difference signal and make it more readily managable by the converter 70.

The converter 70 acquires the data at a fast rate and generates samples. The time spacing of the samples (determined by the sampling rate of the converter) may correspond to a desired spatial resolution along the fibre. Alternatively, the samples may be divided into groups, where the duration of each group is a window in time that determines the spatial resolution, and all samples within the window are processed together to give a value of the Brillouin characteristics for the corresponding part of the fibre. For example, if a spatial resolution of 10 m is required, corresponding to 100 ns of acquisition time, 25 samples can be acquired for each section of fibre (assuming a sampling rate of 250 megasamples per second). These samples are then stored in memory 72 and delivered to a processor 52 for data processing to determine the Brillouin properties and possibly also the physical parameters. The processing may comprise, for example, Fourier transform of the data and fitting to a power spectrum, but any suitable data processing techniques can be used.

As in the previously described embodiments, the processor is connected to the memory array 30 used to program the local oscillator 26, for the purpose of updating the tracking operation. Also the analog-to-digital converter 70 used for the sample acquisition is clocked together with the memory array 30 and the digital-to-analog converter 28 controlling the local oscillator 26, using a clock 32, to ensure that the tracking is maintained in synchronism with the received Brillouin light.

Other Embodiments

The invention is not limited to the embodiments described with regard to FIGS. 1, 2, and 3. Any arrangement can be used in which a signal derived from and therefore representative of the frequency of the received Brillouin line (first signal) is mixed with a signal derived from and therefore representative of the frequency of the Brillouin line measured during an earlier measurement cycle (second signal). The various signals may be mixed optically or electrically, and may be shifted to other frequency domains (optical to microwave for example) by sum or difference frequency mixing prior to heterodyning. Further frequency shifting may be performed after the heterodyning if required to bring the generated difference signal into a particular frequency range or ranges for the acquisition technique chosen. Various stages of filtering and/or amplifying (optical and electrical) may also be included as required. Further, acquisition techniques and frequency determination methods other than the parallel channel approach and the all-digital approach described herein may be used.

For any embodiment, it is possible to perform multiple measurement cycles, i.e. repeat the measurement process for a plurality of probe pulses (with or without updating the tracking using the results of a previous measurement), and average the determined Brillouin properties and/or physical parameters to achieve an improved determination of the properties and/or parameters.

REFERENCES

[1] H. H. Kee, G. P. Lees and T. P. Newson, "All-fiber system for simultaneous interrogation of distributed strain and temperature sensing by spontaneous Brillouin scattering", *Optics Letters*, 2000, 25(10), pp 695-697.

[2] WO 2005/106396.

[3] T. Parker et al, "Simultaneous distributed measurement of strain and temperature from noise-initiated Brillouin scattering in optical fibers", *IEEE Journal of Quantum Electronics*, 1998, 34(4), pp 645-659.

[4] S. M. Maughan, H. H. Kee, and T. P. Newson, "A calibrated 27-km distributed fiber temperature sensor based on microwave heterodyne detection of spontaneous Brillouin backscattered power", *IEEE Photonics Technology Letters*, 2001, 13(5), pp 511-513.

[5] M. N. Alahbabi et al, "High spatial resolution microwave detection system for Brillouin-based distributed temperature and strain sensors", *Measurement Science & Technology,* 2004, 15(8), pp 1539-1543.

[6] L. Thevenaz et al., "Novel schemes for optical signal generation using laser injection locking with application to Brillouin sensing", *Measurement Science & Technology,* 2004, 15, pp 1519-24.

What is claimed is:

1. A method for measuring Brillouin backscattering from an optical fibre, comprising:
    launching a probe pulse of coherent light with a frequency $f_0$ into an optical fibre;
    receiving backscattered light from the optical fibre that includes at least one Brillouin spectral line at a frequency $f_B(t)$ shifted from $f_0$ by a Brillouin shift, the Brillouin spectral line varying with time along the optical fibre;
    producing a first signal that is representative of $f_B(t)$;
    generating a second signal at a frequency $f_1(t)$ that varies with time in the same manner as a Brillouin shift $f_B(t)-f_0$ previously measured from the optical fibre, using information defining the previously measured Brillouin shift;
    mixing the first signal and the second signal to produce a difference signal at a difference frequency $\Delta F(t)=f_B(t)-f_1(t)$, where $\Delta F(t)$ has a nominally constant value with respect to time corresponding to the received backscattered light having a Brillouin shift that matches the previously measured Brillouin shift;
    acquiring the difference signal; and
    processing the difference signal to determine one or more properties of the Brillouin spectral line of the received backscattered light.

2. A method according to claim 1, further comprising using information relating to the Brillouin spectral line determined from processing the difference signal to update the information defining the previously measured Brillouin shift, wherein the frequency $f_1(t)$ of the second signal is updated.

3. A method according to claim 2, further comprising:
    determining a difference $\delta$ between an actual value of the difference frequency $\Delta F(t)$ obtained by mixing the first signal and second signal and a nominal value of $\Delta F(t)$ for one or more values of t; and
    using the one or more values of $\delta$ thus determined to update the information defining the previously measured Brillouin shift, thereby updating the frequency $f_1(t)$ of the second signal.

4. A method according to claim 1, in which:
    producing the first signal that is representative of $f_B(t)$ comprises: producing coherent light at a frequency $f_L$ and directing it onto an optical detector; directing the received backscattered light onto the optical detector to mix with the coherent light at $f_L$ and generate an intermediate signal at a difference frequency $\Delta f_i(t)=f_B(t)-f_L$; and using the electrical output of the optical detector at frequency $\Delta f_i(t)$ as the first signal;
    generating the second signal comprises applying the information defining the previously measured Brillouin shift to an electrical oscillator to generate an electrical signal at the frequency $f_1(t)$; and
    mixing the first signal and the second signal to produce a difference signal comprises mixing the electrical output of the optical detector with the electrical signal from the electrical oscillator to produce an electrical signal at the difference frequency $\Delta F(t)$.

5. A method according to claim 4, in which the difference frequency $\Delta f_i(t)$ is less than 100 GHz.

6. A method according to claim 4, in which $f_0=f_L$.

7. A method according to claim 6, comprising using a single optical source to produce both the coherent light at the frequency $f_L$ and the probe pulse at frequency $f_0$ for launching into the optical fibre.

8. A method according to claim 4, in which the coherent light at the frequency $f_L$ is produced by: modulating an output of an optical source used to produce the probe pulse for launching into the optical fibre so as to generate modulation sidebands; injection-locking a second optical source to one of the modulation sidebands; and using the output of the second optical source as the coherent light at the frequency $f_L$.

9. A method according to claim 1, in which:
    producing the first signal that is representative of $f_B(t)$ comprises taking the received backscattered light;
    generating the second signal comprises applying the information defining the previously measured Brillouin shift to a tunable optical source to generate a coherent optical signal at the frequency $f_1(t)$; and
    mixing the first signal and the second signal to produce a difference signal comprises directing the received backscattered light onto an optical detector and directing the coherent optical signal onto the same optical detector to produce an electrical signal at the difference frequency $\Delta F(t)$.

10. A method according to claim 9, and further comprising, before processing the difference signal, mixing the electrical signal from the optical detector at the difference frequency $\Delta F(t)$ with an output from an electrical local oscillator at a constant frequency $f_C$ to reduce the difference frequency $\Delta F(t)$ to a lower frequency $\Delta F_2(t)$.

11. A method according to claim 9, in which:
    the output of one of the tunable optical source used to generate the coherent optical signal at the frequency $f_1(t)$ and an optical source for generating the probe pulse for launching into the fibre is modulated to produce modulation sidebands;
    the other of the tunable optical source and the optical source is injection-locked to one of the modulation sidebands; and
    the frequency of the modulation is controlled using the information defining the previously measured Brillouin shift to generate the coherent optical signal at the frequency $f_1(t)$.

12. A method according to claim 1, in which:
    acquiring the difference signal comprises digitising the difference signal to obtain a plurality of samples of the difference signal; and
    processing the difference signal comprises digital signal processing of the samples.

13. A method according to claim 12, in which the difference signal is digitised using a sampling rate that is at least twice the largest anticipated value of $\Delta F(t)$.

14. A method according to claim 1, in which:
    acquiring the difference signal comprises:
        separating the difference signal into a plurality of channels, each channel covering a separate frequency band;
        individually detecting a respective portion of the difference signal in each channel;
        digitising each detected portion of the difference signal to obtain a plurality of samples for each channel; and
    processing the difference signal comprises digital signal processing of the samples from each channel with respect to time to determine one or more properties of the Brillouin spectral line.

15. A method according to claim 1, in which:
acquiring the difference signal comprises:
passing the difference signal through a circuit that converts frequency to voltage; and
digitising the voltage; and
processing the difference signal comprises scaling the digitised voltage to provide a measure of the Brillouin shift.

16. A method according to claim 1, in which the one or more properties of the Brillouin spectral line determined from the difference signal include at least one of: the Brillouin frequency $f_B(t)$; an intensity of the Brillouin spectral line; and a linewidth of the Brillouin spectral line.

17. A method according to claim 1, further comprising calculating a value of one or more physical parameters associated with the optical fibre from the one or more determined properties of the Brillouin spectral line and converting time into distance along the optical fibre to obtain an indication of a distribution of the one or more physical parameters over a length of the optical fibre.

18. A method according to claim 1, further comprising repeating the method for further successive probe pulses, and averaging over a plurality of probe pulses to obtain a more accurate determination of the one or more properties of the Brillouin spectral line and/or one or more physical parameters associated with the optical fibre.

19. A method according to claim 1, further comprising, prior to the launching of a probe pulse into the optical fibre, measuring the Brillouin shift produced by the optical fibre to obtain the information defining the previously measured Brillouin shift by:
a) launching a probe pulse of coherent light with a frequency $f_0$ into the optical fibre:
b) receiving backscattered light from the optical fibre that includes at least one Brillouin spectral line at frequency $f_B(t)$ shifted from $f_0$ by a Brillouin shift;
c) producing an initial signal that is representative of $f_B(t)$;
d) generating a further signal at a constant frequency $f_C$ for at least the time taken for backscattered light to be received from the most remote part of the optical fibre;
e) mixing the initial signal and the further signal to produce a difference signal at a difference frequency $\Delta F_i(t)=f_B(t)-f_C$;
f) acquiring the difference signal $\Delta F_i(t)$;
g) repeating steps a) to f) for a plurality of values of $f_C$ across the range of possible values of $f_C$ that give a difference signal within the bandwidth of an apparatus used to acquire the difference signal;
h) processing the acquired difference signals to determine the distribution of the Brillouin shift with time along the optical fibre; and
i) storing the information defining the previously measured Brillouin shift for use in generating the second signal at frequency $f_1(t)$.

20. Apparatus for measuring Brillouin backscattering from an optical fibre comprising:
an optical source operable to generate probe pulses of coherent light at a frequency $f_0$ and launch the probe pulses into an optical fibre;
a backscatter receiving component arranged to receive backscattered light from the optical fibre that includes at least one Brillouin spectral line at a frequency $f_B(t)$ shifted from $f_0$ by a Brillouin shift and produce therefrom a first signal that is representative of $f_B(t)$;
a programmable local oscillator;
a memory array for storing information defining a Brillouin shift $f_B(t)-f_0$ previously measured from the optical fibre, the memory array connected to the programmable local oscillator such that the stored information is to be used by the programmable local oscillator to generate a second signal having a frequency $f_1(t)$ that varies with time in the same way as the previously measured Brillouin shift;
a frequency mixer for receiving and mixing the first signal and the second signal to produce a difference signal at a difference frequency $\Delta F(t)=f_B(t)-f_1(t)$, where $\Delta F(t)$ has a nominally constant value with respect to time corresponding to the received backscattered light having a Brillouin shift that matches the previously measured Brillouin shift;
an acquisition system operable to receive the difference signal from the frequency mixer and record the difference signal; and
a processor operable to process the recorded difference signal to determine one or more properties of the Brillouin spectral line of the received backscattered light.

21. Apparatus according to claim 20, in which the processor is further operable to update the information defining the previously measured Brillouin shift using information relating to the Brillouin spectral line determined from processing the difference signal, wherein the frequency $f_1(t)$ of the second signal is updated.

22. Apparatus according to claim 21, in which the processor is operable to determine a difference δ between an actual value of the difference frequency $\Delta F(t)$ obtained by mixing the first and second signals and a nominal value of $\Delta F(t)$ for one or more values of t, and to use the one or more values of δ to update information stored in the memory array defining the previously measured Brillouin shift, thereby updating the frequency $f_1(t)$ to be generated by the programmable local oscillator.

23. Apparatus according to claim 20, in which:
the backscatter receiving component comprises:
an optical source operable to generate coherent light at a frequency $f_L$; and
an optical detector arranged to receive the coherent light at the frequency $f_L$ and the received backscattered light such that the coherent light and the backscattered light undergo frequency mixing and to generate an electrical output at an intermediate difference frequency $\Delta f_i(t)=f_B(t)-f_L$, the electrical output comprising the first signal;
the programmable local oscillator comprises an electrical oscillator operable to generate an electrical signal at the frequency $f_1(t)$, the electrical signal comprising the second signal; and
the frequency mixer is operable to perform difference frequency mixing of electrical signals and to produce an electrical signal at the difference frequency $\Delta F(t)$.

24. Apparatus according to claim 23, in which the frequency $f_L$ is selected to give an intermediate difference frequency $\Delta f_i(t)$ less than 100 GHz.

25. Apparatus according to claim 23, in which $f_0=f_L$.

26. Apparatus according to claim 25, in which the optical source operable to generate probe pulses and the optical source operable to generate coherent light at a frequency $f_L$ are the same optical source.

27. Apparatus according to claim 23, in which the optical source operable to generate coherent light at frequency $f_L$ is injection-locked to a modulation sideband of a modulated output of the optical source operable to generate probe pulses.

28. Apparatus according to claim 20, in which:
the backscatter receiving component comprises a component operable to receive and direct backscattered light from the optical fibre such that the first signal comprises the backscattered light;
the programmable local oscillator comprises a tunable optical source operable to generate an optical signal at the frequency $f_1(t)$, the optical signal comprising the second signal; and
the frequency mixer comprises an optical detector arranged to receive and mix the backscattered light and the optical signal and produce an electrical signal at the difference frequency $\Delta F(t)$.

29. Apparatus according to claim 28, and further comprising a secondary electrical local oscillator operable to generate an output at a constant frequency $f_C$, and a secondary frequency mixer arranged to receive and mix the output of the secondary electrical local oscillator with the electrical signal at the difference frequency $\Delta F(t)$ from the optical detector to reduce the difference frequency $\Delta F(t)$ to a lower frequency $\Delta F_2(t)$ before the acquisition system receives the difference signal.

30. Apparatus according to claim 28, in which:
the output of one of the tunable optical source used to generate the optical signal at the frequency $f_1(t)$ and the optical source operable to generate probe pulses is modulated to produce modulation sidebands;
the other of the tunable optical source and the optical source is injection-locked to one of the modulation sidebands; and
the frequency of the modulation is controlled using information defining the previously measured Brillouin shift stored in the memory array to generate the optical signal at the frequency $f_1(t)$.

31. Apparatus according to claim 20, in which:
the acquisition system comprises an analog-to-digital converter operable to digitise the received difference signal to produce a plurality of samples of the difference signal and a memory array to record the samples; and
the processor is operable to perform digital signal processing of the samples.

32. Apparatus according to claim 31, in which the analog-to-digital converter is operable to digitise the received difference signal at a sampling rate that is at least twice the largest anticipated value of $\Delta F(t)$.

33. Apparatus according to claim 20, in which:
the acquisition system comprises:
a plurality of parallel frequency channels each covering a separate frequency band and each channel comprising:
an electrical frequency mixer with an associated electrical local oscillator, where each electrical local oscillator generates a signal at a different frequency such that the electrical frequency mixers act as filters the define the frequency bands of each channel;
a detector to detect the output of the electrical frequency mixer;
an analog-to-digital converter to digitise the output of the detector to produce a plurality of samples; and
memory to record the samples; and
a signal splitter operable to divide the difference signal received from the frequency mixer and distribute it between the channels; and
wherein the processor is operable to perform digital signal processing of the samples from each channel with respect to time to determine one or more properties of the Brillouin spectral line.

34. Apparatus according to claim 20, in which the one or more properties of the Brillouin spectral line determined from the difference signal include at least one of: the Brillouin frequency $f_B(t)$; the intensity of the Brillouin spectral line; and the linewidth of the Brillouin spectral line.

35. Apparatus according to claim 20, in which the processor is further operable to calculate a value of one or more physical parameters associated with the optical fibre from the one or more determined properties of the Brillouin spectral line and convert time into distance along the optical fibre to obtain an indication of a distribution of the one or more physical parameters over a length of the optical fibre.

* * * * *